(12) United States Patent
Rauch

(10) Patent No.: US 12,037,098 B2
(45) Date of Patent: Jul. 16, 2024

(54) AIRCRAFT INTERIOR CLADDING, SURFACE CHANGE ELEMENT FOR AIRCRAFT INTERIOR CLADDING, USE, METHOD OF PRODUCTION AND METHOD OF REVISION

(71) Applicant: Siegbert Rauch, Munich (DE)

(72) Inventor: Siegbert Rauch, Munich (DE)

( * ) Notice: Subject to any disclaimer, the term of this patent is extended or adjusted under 35 U.S.C. 154(b) by 229 days.

(21) Appl. No.: 17/634,205

(22) PCT Filed: Aug. 6, 2020

(86) PCT No.: PCT/EP2020/072112
§ 371 (c)(1),
(2) Date: Feb. 9, 2022

(87) PCT Pub. No.: WO2021/028306
PCT Pub. Date: Feb. 18, 2021

(65) Prior Publication Data
US 2022/0315198 A1    Oct. 6, 2022

(30) Foreign Application Priority Data
Aug. 9, 2019  (EP) .................................... 19190939

(51) Int. Cl.
*B64C 1/06*  (2006.01)
*B32B 27/38* (2006.01)
(Continued)

(52) U.S. Cl.
CPC .............. *B64C 1/066* (2013.01); *B32B 27/38* (2013.01); *B64F 5/40* (2017.01); *B32B 2255/10* (2013.01);
(Continued)

(58) Field of Classification Search
CPC ..... B64C 1/066; B32B 27/38; B32B 2255/10; B32B 2255/26; B32B 2262/101; B32B 2262/106; B32B 2605/18; B64F 5/40
See application file for complete search history.

(56) References Cited

U.S. PATENT DOCUMENTS

2005/0005544 A1\* 1/2005 Borowiecki ............ B64C 1/066
52/204.5
2018/0170548 A1\* 6/2018 Wohlmann ......... B64D 11/0606

FOREIGN PATENT DOCUMENTS

| DE | 102015105619 A1 | 10/2016 |
| EP | 3283377 A1 | 2/2018 |
| WO | 2016166028 A1 | 10/2016 |

OTHER PUBLICATIONS

International Search Report issued for PCT/EP2020/072112, 4 pages.
(Continued)

*Primary Examiner* — Justin M Benedik
(74) *Attorney, Agent, or Firm* — Shook, Hardy & Bacon L.L.P.

(57) ABSTRACT

In summary, the present application relates to an aircraft interior paneling (10) comprising: —a planar replaceable surface element (40); —a structural element (20); —at least one connection element (30); wherein the replaceable surface element (40) is detachably fastened to the structural element (20) by means of the at least one connection element (30), and wherein the replaceable surface element (40) comprises: —a support element (42), wherein, in the thickness direction of the support element (42), the support element (42) comprises a plurality of successive layers which comprise woven fabrics; —a decorative element (50) which is attached to a decorative connection surface (52) of the support element (42), wherein the support element (42) is dimensionally stable; and a replaceable surface element (Continued)

Figure 1:
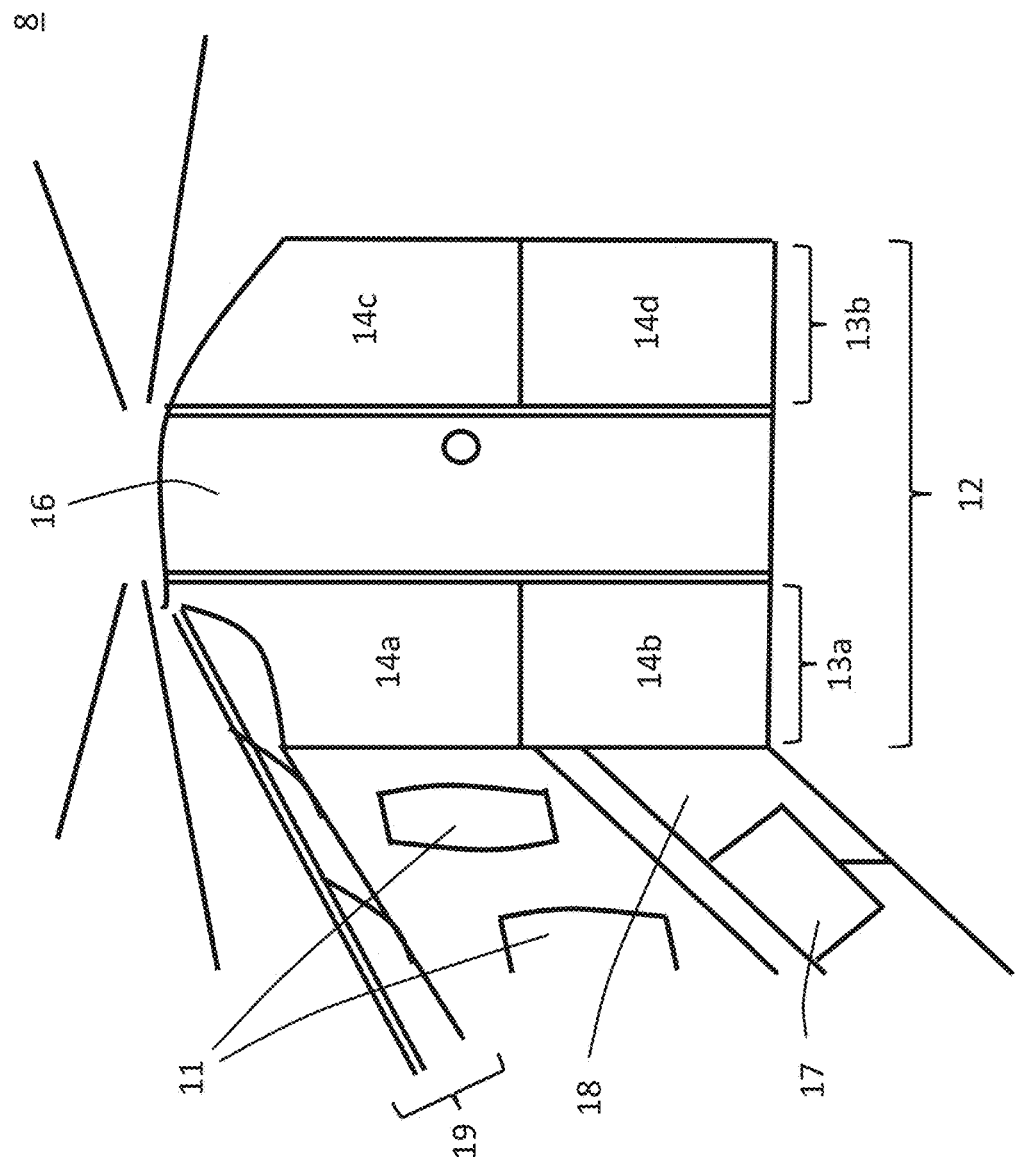

(40) for an aircraft interior paneling (10); the use of a replaceable surface element (40) for an aircraft interior paneling (10); a method for producing a replaceable surface element (40) for an aircraft interior paneling (10); and a method for updating an existing aircraft interior paneling (100).

11 Claims, 12 Drawing Sheets

(51) Int. Cl.
  *B64F 5/40*  (2017.01)
  *B64C 1/00*  (2006.01)
(52) U.S. Cl.
  CPC ..... *B32B 2255/26* (2013.01); *B32B 2262/101* (2013.01); *B32B 2262/106* (2013.01); *B32B 2605/18* (2013.01); *B64C 2001/0072* (2013.01)

(56) References Cited

OTHER PUBLICATIONS

International Preliminary Report on Patentability received for PCT Application No. PCT/EP2020/072112, mailed on Feb. 17, 2022, 17 pages.

\* cited by examiner

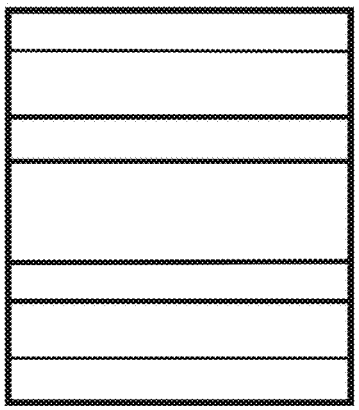

FIG. 8A

Decorative element: lacquer layer, 0.35 mm
Decorative element: carbon fiber fabric; 1-L; 0.6 mm
Adjacent layer: carbon fiber fabric; 1-L; 0.26 mm
Central layer: glass fiber fabric; 3-L; 0.6 mm
Adjacent layer: carbon fiber fabric; 1-L; 0.26 mm
Rear side element: carbon fiber fabric; 1-L; 0.6 mm
Rear side element: lacquer layer, 0.35 mm

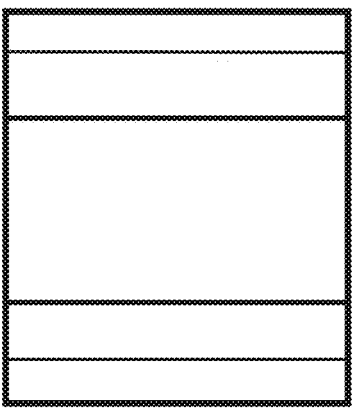

FIG. 8B

Decorative element: lacquer layer, 0.35 mm
Decorative element: carbon fiber fabric; 1-L; 0.4 mm
Central layer: carbon fiber fabric; 5-L; 1.6 mm
Rear side element: carbon fiber fabric; 1-L; 0.4 mm
Rear side element: lacquer layer, 0.35 mm

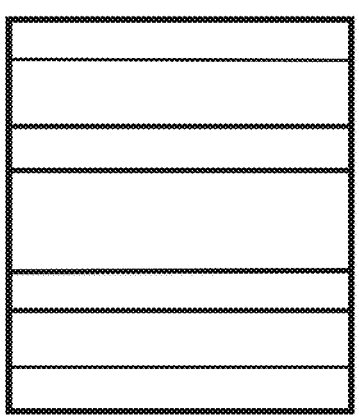

FIG. 8C

Decorative element: lacquer layer, 0.35 mm
Decorative element: veneer; 1-L; 0.6 mm
Adjacent layer: carbon fiber fabric; 1-L; 0.26 mm
Central layer: glass fiber fabric; 3-L; 0.6 mm
Adjacent layer: carbon fiber fabric; 1-L; 0.26 mm
Rear side element: veneer; 1-L; 0.6 mm
Rear side element: lacquer layer, 0,.35 mm FIG. 8D 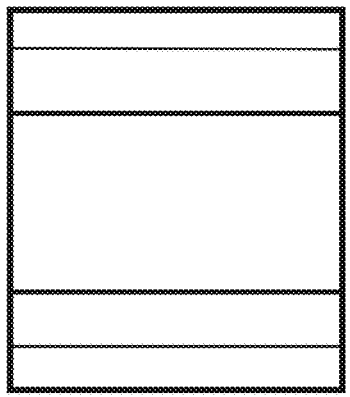 Decorative element : lacquer layer, 0.35 mm
Decorative element : veneer; 1-L; 0.6 mm Central layer: carbon fiber fabric; 3-L; 1.2 mm Rear side element : veneer; 1-L; 0.6 mm
Rear side element : lacquer layer, 0,35 mm FIG. 8E 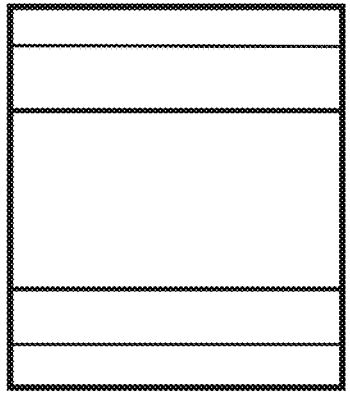 Decorative element : lacquer layer, 0.35 mm
Decorative element : veneer; 1-L; 0.6 mm Central layer: carbon fiber fabric; 4-L; 1.2 mm Rear side element : veneer; 1-L; 0.6 mm
Rear side element : lacquer layer, 0.35 mm FIG. 8F 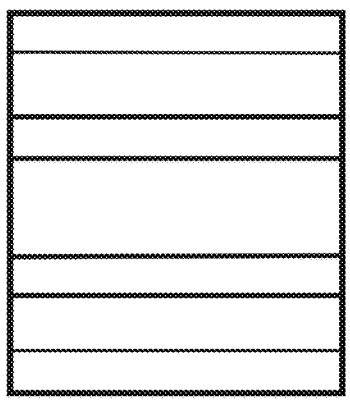 Decorative element: leather, 0.5 mm
Decorative element: carbon fiber fabric; 1-L; 0.45 mm
Adjacent layer: carbon fiber fabric; 1-L; 0.26 mm
Central layer: glass fiber fabric; 3-L; 0.6 mm
Adjacent layer: carbon fiber fabric; 1-L; 0.26 mm
Rear side element: carbon fiber fabric; 1-L; 0.45 mm
Rear side element: leather, 0.5 mm

AIRCRAFT INTERIOR CLADDING, SURFACE CHANGE ELEMENT FOR AIRCRAFT INTERIOR CLADDING, USE, METHOD OF PRODUCTION AND METHOD OF REVISION

CROSS-REFERENCE TO RELATED APPLICATIONS AND PRIORITY CLAIM

This application is a 371 national stage of PCT/EP2020/072112, filed Aug. 6, 2020, titled "FLUGZEUGINTERIEURVERKLEIDUNG, OBERFLACHENWECHSELELEMENT FUR EINE FLUGZEUGINTERIEURVERKLEIDUNG, VERWENDUNG, VERFAHREN ZUR HERSTELLUNG UND VERFAHREN ZUM UBERARBEITEN," which claims priority to European Patent App. No. 19 190 939.9, filed Aug. 9, 2019, titled "FLUGZEUGINTERIEURVERKLEIDUNG, OBERFLACHENWECHSELELEMENT FUR EINE FLUGZEUGINTERIEURVERKLEIDUNG, VERWENDUNG, VERFAHREN ZUR HERSTELLUNG UND VERFAHREN ZUM UBERARBEITEN." The contents of both of the aformentioned applications is incorporated herein by reference in the entirety.

The invention relates to an aircraft interior cladding, a surface change element for an aircraft interior cladding, the use of a surface change element for an aircraft interior cladding, a method of producing a surface change element for an aircraft interior cladding, and a method of reworking an existing aircraft interior cladding.

As a rule, conventional aircraft interior claddings consist of a honeycomb structure as a structural element, e.g. an aramid honeycomb structure or an aluminum honeycomb structure, with a glued-on veneer, mirror or other surface element adhesively attached to the structural element. If the surface element is damaged, in conventional aircraft interior claddings, the exchange is very complex and/or complex work is necessary to restore the condition of an undamaged aircraft interior cladding.

As a rule, structures and/or materials installed in the aircraft interior cladding are not or not any more known when damage occurs and exchange or repair becomes necessary. However, various aeronautical specifications, in particular with respect to the fire behavior measured in fire tests, require that at least the material properties of the previously installed structures be achieved in the case of repair or exchange. Therefore, in order to recognize the installed structures and/or materials, necessary exchange or repair in the event of damage generally includes exchanging or removing the affected aircraft interior cladding. In order to make this exchange or dismantling possible in the first place, however, the exchange or dismantling of the aircraft interior cladding concerned additionally requires the dismantling of further elements of the aircraft interior that adjoin the aircraft interior cladding to be exchanged. As a result, the conventional exchange of the aircraft interior cladding is associated with high costs and, due to the effort involved, can take several weeks during which the aircraft may not be used.

In summary, the conventional exchange or repair of aircraft interior claddings comprises the following steps:
  dismantling the aircraft interior elements adjacent the aircraft interior cladding;
  storing the dismantled elements of the aircraft interior;
  dismantling the aircraft interior cladding to be exchanged or repaired;
  removing the surface element from the structural element of the aircraft interior cladding;
  examining the surface element and structural element of the aircraft interior cladding to be exchanged or repaired with regard to material, material thickness or thickness, material properties in order to determine the materials used;
  replicating the surface element and structural element of the aircraft interior cladding to be exchanged or repaired in multiple copies;
  carrying out material tests, in particular fire tests, of the replicated surface element and structural element, if necessary individually and/or in the assembly;
  having the material tests, in particular fire tests, approved by a company with EASA Part 21J certification, or in accordance with the EASA Part 21J regulations;
  installing a copy of the replicated surface element and structural element in the aircraft, as an exchanged or repaired aircraft interior cladding;
  installing the stored, dismantled elements of the aircraft interior; and finally
  having the exchanged or repaired aircraft interior approved by a company with EASA Part 145 A rating.

As illustrated by the above process, the conventional exchange or repair of the aircraft interior cladding is associated with high costs, since in general, due to the nested construction as is common in aircraft, adjacent elements of the aircraft interior must also be dismantled, and specifically before the actual dismantling and exchange of the damaged aircraft interior cladding.

It is therefore an object of the present invention to provide an aircraft interior cladding, and in particular a surface change element, which enables a quick exchange or a quick repair.

The above-described object is achieved by the subject-matter of the independent claims, preferred embodiments are defined in the dependent claims.

One aspect of the invention relates to an aircraft interior cladding, comprising a plate-shaped surface change element, a structural element, at least one connecting element, wherein the surface change element is detachably secured to the structural element by means of the at least one connecting element, wherein the surface change element further comprises a carrier element, the carrier element having in the thickness direction of the carrier element a plurality of successive layers which comprise fiber fabrics, and a decorative element attached to a decor connecting surface of the carrier element, wherein the carrier element is dimensionally stable.

Advantageously, the above-described aircraft interior cladding allows a quick exchange of the surface change element of the aircraft interior cladding and only a small amount of work and thus only low costs arise for the exchange or repair of a damaged aircraft interior cladding. Furthermore, the aircraft interior cladding allows the surface change element to exchange the surface change element to be exchanged or repaired with a dimensionally stable carrier element with dimensional accuracy, which prevents costly reworking on the carrier element and/or the surface change element, which furthermore reduces the procedural, temporal and therefore costly exchange or repair of the aircraft interior cladding in the event of damage. Furthermore, component and material tests, in particular fire tests, can advantageously be carried out prior to the actual dismantling or exchange of the damaged surface change element, using surface change elements for the exchange. The validation documents resulting from the component and material tests can thus be prepared prior to the actual exchange or repair, so that the exchange or repair of the surface change element can be carried out significantly faster than in the conventional prior art.

Advantageously, by means of the aircraft interior cladding according to the invention, in the event of damage to the aircraft interior cladding, only the surface change element may be exchanged or repaired, whereby a quick exchange or repair can take place, costs associated with the exchange or repair are reduced, and the usability of an aircraft is increased in addition. Furthermore advantageously, a surface change element, in particular a carrier element of the surface change element, is provided, which is designed to be dimensionally stable. Due to the dimensional stability of the carrier element, surface change elements for the exchange or repair can be produced in advance of the actual exchange or repair, which are identical in shape to the surface change element to be exchanged over larger areas, whereby tests necessary prior to the exchange or repair, in particular fire tests, can be carried out using surface change elements for the exchange. Thus, on the one hand, the aircraft relating to the exchange or repair need only be on the ground for a short time compared to the conventional exchange or repair method, which in other words increases the usability of the aircraft. And on the other hand, the total time for the necessary exchange or repair is reduced, which also leads to cost savings.

It is also advantageous that the surface change element to be exchanged and the structural element of the aircraft interior cladding are known before the necessary exchange or repair, in particular the material of the surface change element and the structural element are known, so that surface change elements that can be produced prior to the exchange or repair for the exchange, as well as structural elements, can be produced in advance with the appropriate material. Thereby, material tests, and in particular fire tests, can be carried out prior to a necessary exchange or repair with the material that corresponds to the surface change element to be exchanged and the structural element associated therewith, which further reduces the time required for a necessary exchange or repair and also saves costs associated therewith.

Advantageously, the aircraft interior cladding according to the invention allows an exchange or a repair of an aircraft interior cladding with the following steps:
producing surface change elements for the exchange and structural elements corresponding to the aircraft interior cladding to be exchanged or repaired in multiple copies;
carrying out material tests, in particular fire tests, on the produced surface change element and structural element, if necessary individually and/or in the assembly;
having the material tests, in particular fire tests, approved by a company with EASA Part 21 J certification, or in accordance with the EASA Part 21 J regulations;
dismantling the surface change element of the aircraft interior cladding to be exchanged or repaired;
installing a copy of the produced surface change element for the exchange in the aircraft; and finally
having the exchanged or repaired aircraft interior approved by a company with EASA Part 145 A rating.

In the following, various terms will be used more frequently, the understanding of which is to be facilitated by the following definitions.

An element is referred to as plate-shaped when it is substantially flat, i.e. extends only slightly in the thickness direction, compared to the two spatial directions orthogonal thereto. In other words, a plate-shaped element has a small thickness compared to the area of the element in question.

A layer is a region of an element that is substantially delimited from other adjacent layers of the same element or further elements in the thickness direction. Here, a layer can comprise different structures, applications, materials and material combinations, as well as be composed of one or more layers of specific applications, materials and material combinations, such as lacquer, wood, veneer, leather, one or more layers of fiber fabric, one or more layers of fiber laid fabric, one or more layers of fiber braids, thermoplastics, thermosets such as epoxies, and one or more layers of plastics reinforced by fiber fabric.

A decor connecting surface and a rear side connecting surface are surfaces of a carrier element that lie opposite to one another in the thickness direction, the decor connecting surface and the rear side connecting surface being formed substantially normal to the thickness direction of the carrier element.

A fabric or fiber fabric is a textile structure comprising fibers arranged in two different main directions, the fibers preferably being oriented orthogonally or optionally in the angular range of 20° to 90° to each other in their main directions, and additionally alternately overlap in the thickness direction according to a predetermined rule. For example, the fibers can alternately overlap in the thickness direction so that a fiber of the one main direction is arranged across the width of a fiber of the other main direction above this fiber of the other main direction and is arranged following said one fiber in said one main direction next below a further fiber of the other main direction. If the fiber of said one main direction is arranged in a rhythm or a predetermined rule in which it is alternately arranged above and below the fibers of the other main direction, then we speak of a plain weave or 1/1 weave. This rhythm of the arrangement of the fibers in the fabric to each other can also deviate from this by the fiber of one main direction being arranged above two fibers of the other main direction and then arranged below a fiber of the other main direction, which represents a 2/1 weave, which is an example of a twill weave. A twill weave can also be a 2/2, 2/1, 3/1, 3/2, 3/3 weave, for example.

An element is dimensionally stable when it retains its shape without the action of external forces or under the action of minor forces, i.e. does not deflect, deform, warp, twist, bulge or the like. In other words, an element is dimensionally stable when it does not deflect, deform, warp, twist, bulge or the like due to internal stresses.

The connection of two elements is not non-destructively detachable, when their detachment causes the partial or complete destruction of at least one of the two elements to be detached from one another. The connection of two elements cannot be released non-destructively even if the use of solvents to detach the two elements from one another causes at least the negative impairment of the material properties or structure of at least one of the two elements. Examples of connections that cannot be released in a non-destructive manner are adhesive connections such as adhesives, mechanical connections such as rivets, and other connections that fulfill the associated property of not non-destructive detachability.

The aircraft interior cladding preferably has a locking element arranged at the structural element in order to detachably lock the surface change element at the structural element. The locking element can be a rail, a clamp, a hinge with a rail, a frame or clip-on frame, or the like. On the one hand, the locking element supports the rapid exchange of the surface change element in that the surface change element is guided or held for the exchange during installation on the structural element by means of the locking element. On the other hand, the locking element serves to lock the surface change element at the structural element in order to prevent the surface change element from self-detaching from the structural element, in particular during flight.

Preferably, the surface change element has a rear side element, the rear side element being attached to a rear side connecting surface of the carrier element, the rear side connecting surface being opposite the decor connecting surface in the thickness direction of the carrier element.

Advantageously, the attachment of the rear side element in the thickness direction of the carrier element opposite to the decorative element makes it possible to compensate for possible loads brought up by the attachment of the decorative element on the carrier element. The rear side element can provide additional stiffening for the carrier element. In addition, the rear side element can also apply an additional load to the carrier element, which preferably counteracts a possible load applied by the decorative element. Thereby, on the one hand, the dimensional stability of the carrier element can be increased and, on the other hand, the dimensional stability of the surface element itself can be improved.

Furthermore, the decorative element of the surface change element and/or the rear side element of the surface change element preferably each have a lacquer layer. In particular, the lacquer layer for the decorative element and the lacquer layer for the rear side element can comprise or consist of the same lacquer. For example, the lacquer layer for the decorative element and the lacquer layer for the rear side element can comprise or consist of different lacquer. Examples of lacquers can be PUR (polyurethane) lacquers, water lacquers, DD (Desmodur and/or Desmophen) lacquers, UV-curing lacquers, UP (polyester) lacquers and UPE-2K (polyester, 2-component) lacquers or PU (Polyurethane/acrylate) hybrid lacquers. Furthermore, the lacquer layer for the decorative element can be 0.2 mm to 0.5 mm thick, preferably 0.3 mm to 0.4 mm thick, particularly preferably 0.35 mm thick. The lacquer layer for the rear side element can be 0.2 mm to 0.5 mm thick, preferably 0.3 mm to 0.4 mm thick, particularly preferably 0.35 mm thick.

In particular, the lacquer layer for the decorative element and the lacquer layer for the rear side element can be of the same thickness. Lacquer layers of the same thickness or the application of lacquer layers of the same thickness for the decorative element and for the rear side element increase the dimensional stability of the surface element and reduce warping by uniform forces being applied to the carrier element while the lacquer is curing. For example, the lacquer layer for the decorative element and the lacquer layer for the rear side element can also be of different thicknesses. Lacquer layers of different thicknesses or the application of lacquer layers of different thicknesses for the decorative element and for the rear side element allow a targeted adaptation of the dimensional stability of the surface element by application of different forces to the carrier element while the lacquer is curing. If the lacquers are applied under different conditions, i.e. at different temperatures, humidity levels, times, then differently thick lacquer layers for the decorative element and for the rear side element can compensate for different effects in connection with the application of lacquer for the decorative element or for the rear side element by the respective opposite element (decorative element or rear side element) in order to ensure the dimensional stability of the surface element, to further increase it, and possibly to counteract warping or one-sided warping of the surface element or the carrier element.

Further preferably, the decorative element is connected to the decor connecting surface of the carrier element in a manner that it cannot be detached non-destructively and/or the rear side element is connected to the rear side connecting surface of the carrier element in a manner that it cannot be detached non-destructively.

The not non-destructively releasable connection of the decorative element to the decor connecting surface provides a connection between the decorative element and the carrier element that makes it possible to transfer the dimensional stability of the carrier element to the decorative element connected to it. In other words, the not non-destructively releasable connection of the decorative element with the dimensionally stable carrier element also makes the surface change element dimensionally stable. Advantageously, the not non-destructively releasable connection of the decorative element to the dimensionally stable carrier element can also be used to influence the dimensional stability of the surface change element as a whole by means of the material of the decorative element. For example, the not non-destructively releasable connection can consist of an adhesive such as glue, an epoxy, in particular fireproof epoxy, of rivets or other non-destructively detachable connections.

The not non-destructively detachable connection of the rear side element to the rear side connecting surface provides a connection between the rear side element and the carrier element that makes it possible to transfer the dimensional stability of the carrier element to the rear side element connected to it. In other words, the not non-destructively releasable connection of the rear side element to the dimensionally stable carrier element also makes the surface change element dimensionally stable. Advantageously, the not non-destructively releasable connection between the rear side element and the dimensionally stable carrier element can also be used to influence the dimensional stability of the surface change element as a whole by means of the material of the rear side element. For example, the not non-destructively releasable connection can consist of an adhesive such as glue, an epoxy, in particular fireproof epoxy, of rivets or other connections that cannot be released non-destructively.

Further preferably, in the thickness direction toward the carrier element, the decorative element and the rear side element each comprise a carbon fiber fabric and/or a veneer element. For example, the decorative element and/or the rear side element can also have or consist of further materials and fabrics, such as leather, real wood or other synthetic wood laminates, nonwovens, plastic elements, tiles, mirrors, printed foils, furs, fabrics or other optical or superficial structures.

Further preferably, the veneer element of the decorative element and the veneer element of the rear side element have the same thickness. For example, other materials, of which the decorative element can at least partially consist and of which the rear side element can at least partially consist, such as leather, real wood or other synthetic wood laminates, nonwovens, plastic elements, tiles, mirrors, printed foils, furs, fabrics can have the same thickness.

Same thicknesses make it possible to further improve the dimensional stability of the surface element, in particular if the same materials are used for the decorative element and for the rear side element. Different thicknesses for the materials used for the decorative element and for the rear side element can be used to take into account certain boundary conditions during manufacture or production and/or the boundary conditions in the aircraft. Thus, different thicknesses can be useful in particular with differing material combinations of decorative elements and rear side elements and/or certain boundary conditions during manufacture or production and/or in the aircraft in order to increase the dimensional stability of the surface change element.

Further preferably, the carrier element comprises, arranged centrally in the thickness direction, a central layer of a carbon fiber fabric-reinforced plastic or a glass fiber fabric-reinforced plastic. In particular, the central layer can comprise or consist of several layers of glass fiber fabric-reinforced plastics, such as one, two, three, four or five layers of glass fiber fabric-reinforced plastics. Alternatively, the central layer can comprise or consist of several layers of carbon fiber fabric-reinforced plastics, in particular one, two, three, four or five layers of carbon fiber fabric-reinforced plastics.

Glass fiber fabrics can in particular have a twill or plain weave, whereby the rule or the sequence of the mutual overlap of the glass fibers in the fabric itself is determined. Preferably, the glass fibers in the glass fiber fabric are oriented in two main directions which, lying in one plane, are preferably arranged approx. orthogonally, i.e. at an angle of approx. 90°, or optionally in an angle range of 20° to 90° to one another. Due to the orientation of the two main directions of the glass fibers to one another the mechanical properties of the fabric can be influenced, whereby the glass fiber fabric and the plastic reinforced therewith are given strong direction-dependent properties or less strong direction-dependent properties. Here, it applies that direction-dependent properties are more pronounced in the case of small angular differences between the main directions (for example 20°), whereas less direction-dependent properties are pronounced in the case of angular differences between the main directions of 90° in contrast.

In principle, epoxies, polyurethanes and other thermosets or thermoplastics can be used as plastics reinforced with glass fiber fabric. Optionally, non-plastics can also serve as a matrix for the glass fiber fabric. For example, ceramics, carbon, glass, metals and many other materials can be used as a matrix for glass fiber fabrics.

Carbon fiber fabrics can in particular have a twill or plain weave, whereby the rule or the sequence of the mutual overlap of the carbon fibers in the fabric itself is determined. Preferably, the carbon fibers in the carbon fiber fabric are oriented in two main directions which, lying in one plane, are preferably arranged orthogonally or alternatively in the angular range of 20° to 90° to one another. Due to the orientation of the two main directions of the carbon fibers to one another the mechanical properties of the fabric can be influenced, whereby the carbon fiber fabric and the plastic reinforced with it are given strong direction-dependent properties or less strong direction-dependent properties. Here, it applies that direction-dependent properties are more pronounced in the case of small angular differences between the main directions (for example 20°), whereas less direction-dependent properties are pronounced in the case of angular differences between the main directions of 90° in contrast.

In principle, epoxies, polyurethanes and other thermosets or thermoplastics can be used as plastics reinforced with carbon fiber fabric. Optionally, non-plastics can also serve as a matrix for the carbon fiber fabric. For example, ceramics, carbon, glass, metals and many other materials can be used as a matrix for carbon fiber fabrics.

By the central layer of the carrier element, which comprises or consists of one or more layers of carbon fiber fabric or glass fiber fabric-reinforced plastic, the dimensional stability of the carrier element is improved. In particular, through the use of fiber fabrics for reinforcement and the associated alternating overlap of the fibers, the material properties, in particular stiffnesses, are not only improved in the plane but also perpendicular to the plane or in the thickness direction, so that the dimensional stability of the carrier element can be increased in a preferred manner.

In a further preferred embodiment, the carrier element has an adjacent layer, which comprises carbon fiber fabric, on both sides outwardly adjoining the central layer in the thickness direction. Here, the adjacent layer can comprise at least one layer of carbon fiber fabric-reinforced plastic or optionally at least one layer of glass fiber fabric-reinforced plastic. In particular, the adjacent layer can comprise or consist of one, two, three, four or five layers of carbon fiber fabric-reinforced plastic and/or glass fiber fabric-reinforced plastic.

Due to the adjacent layers, which e.g. comprise carbon fiber fabric-reinforced plastic and which are connected to the central layer on both sides or opposite one another, the adjacent layers are therefore arranged outside the center of the thickness of the carrier element. This off-center arrangement of the adjacent layers on the central layer gives the carrier element particularly high rigidity of the carrier element in three-dimensional space. The result is that the carrier element is not only stiff in the plane that spans perpendicular to the thickness direction of the carrier element, but in particular is also stiff with respect to deflections perpendicular to this plane, such as when bending. Thus, the adjacent layers, which preferably adjoin the central layer on both sides or opposite one another, further increase the dimensional stability of the carrier element.

The adjacent layer, which comprises e.g. carbon fiber fabric-reinforced plastic, can be attached to the central layer in various ways. For example, it is possible for the textile fiber fabrics of the central layer and the adjacent layer to be first layered successively in a dry or unimpregnated manner, i.e. without a matrix, and then be impregnated or soaked with resin together, in order to then in turn be cured together. Instead of dry or unimpregnated textiles as fiber fabrics, it is also possible to stack pre-impregnated fiber fabrics, so-called prepregs, i.e. fiber fabrics already impregnated with resin, on top of one another and to then cure them together. In addition, it is possible to cure the previously or subsequently impregnated fiber fabrics of the central layer and the previously or subsequently impregnated fiber fabrics of the adjacent layer separately from one another and to then bond them together adhesively and/or mechanically.

The carbon fiber fabric preferably used for the central layer and the respective adjacent layer to reinforce a plastic can in particular have a weight per unit area of 160 g/m² and preferably be in a range from 120 g/m² to 300 g/m², particularly preferably in a range from 150 g/m² to 180 g/m². Furthermore, the carbon fiber fabric can be in a plain weave or a twill weave, in which the intersecting carbon fibers are preferably oriented at angles of approx. 0° and 90° to one another, in other words are approx. orthogonal to one another. The glass fiber fabrics used for the glass fiber fabric-reinforced plastic can in particular have a weight per unit area of 163 g/m² and are preferably in the range from 120 to 300 g/m², particularly preferably in the range from 150 g/m² to 180 g/m². The glass fiber fabrics can be in a twill weave or a plain weave, with the intersecting glass fibers preferably being oriented at angles of approx. 0° and 90° to one another, in other words being approx. orthogonal to one another.

The material thicknesses in the thickness direction for the central layer are preferably in the range from 0.12 mm to 2.0 mm, particularly preferably in the range from 0.6 mm to 1.6 mm. The material thicknesses in the thickness direction for the adjacent layer are preferably in the range from 0.12 mm to 1.0 mm, particularly preferably in the range from 0.2 mm to 0.4 mm. The material thicknesses in the thickness direction for the decorative element are preferably in the range from 0.2 mm to 1.5 mm, particularly preferably in the range from 0.7 mm to 1.0 mm. The material thicknesses in the thickness direction for the rear side element are preferably in the range from 0.2 mm to 1.5 mm, particularly preferably in the range from 0.7 mm to 1.0 mm. The material thicknesses mentioned represent values that are in particular suitable for the formation of a surface change element according to the invention. While maintaining proportions that are particularly dimensionally stable, material thicknesses deviating therefrom can also be technically practical for the individual layers or elements, especially in view of the various possible material combinations that can be realized within a surface change element.

The individual layers of glass fiber fabric can preferably have a material thickness of 0.12 mm to 0.35 mm, as can the individual layers of carbon fiber fabric.

Further preferably, the carrier element of the surface change element is constructed symmetrically in the thickness direction. In other words, a carrier element that is symmetrical in the thickness direction has a central plane that is spanned perpendicular to the thickness direction and lies in the geometric center of the thickness of the carrier element, the materials and/or fiber orientations and/or thicknesses of the respective layers of the carrier element being formed symmetrical to this central plane.

Furthermore, the carrier element, which is formed symmetrically in the thickness direction, can have an adjacent layer adjoining outward on both sides, so that the materials and/or fiber orientations and/or thicknesses of the adjacent layer adjoining outward on both sides are also formed symmetrically to the center plane with respect to the adjacent layer.

Further preferably, the surface change element is formed symmetrically in the thickness direction. This means that in addition to the carrier element, which is symmetrical in the thickness direction, the decorative element and the rear side element are also formed symmetrically to the center plane, i.e. are formed symmetrically with regard to the materials and/or fiber orientations and/or thicknesses.

Further preferred embodiments of the aircraft interior cladding can have surface change elements with the following layered structures.

In some of the following variants, several materials are used for the decorative elements and rear side elements, so that the decorative element and the rear side element are subdivided for clarity, for which the terms decorative element upper layer, decorative element lower layer, and rear side element upper layer and rear side element lower layer are used. The decorative element upper layer and the rear side element upper layer are on the outside in the thickness direction of the surface change element. In contrast, the decorative element lower layer and the rear side element lower layer lie in the thickness direction between the decorative element upper layer or the rear side element upper layer and the carrier element, formed from the central layer plus optionally adjacent layer(s). Furthermore, for the sake of clarity, the sub-items of the respective variant are arranged in the thickness direction, the top sub-item corresponding to the layer or element arranged at the very top in the thickness direction and the lowest sub-item corresponding to the layer or element arranged at the very bottom in the thickness direction.

Variant—1 decorative element top layer—lacquer layer, approx. 0.35 mm
decorative element lower layer—carbon fiber fabric 410 g/m$^2$—(twill weave), (design carbon)—1 layer, material thickness 0.6 mm
adjacent layer of carbon fiber fabric 160 g/m$^2$—(plain weave)—1 layer, material thickness 0.26 mm
central layer glass fiber fabric 163 g/m$^2$—(plain weave)—3 layers, CAS 110/0009, total material thickness 0.6 mm
adjacent layer of carbon fiber fabric 160 g/m$^2$—(plain weave)—1 layer, material thickness 0.26 mm
rear side element lower layer carbon fiber fabric 410 g/m$^2$—(twill weave), (design carbon)—1 layer, material thickness 0.6 mm
rear side element top layer lacquer layer, approx. 0.35 mm; or Variant—2 decorative element top layer—lacquer layer, approx. 0.35 mm
decorative element lower layer—carbon fiber fabric 240 g/m$^2$—(twill weave),—1 layer, material thickness 0.4 mm
central layer carbon fiber fabric 200 g/m$^2$—(plain weave)—5 layers, material thickness 1.6 mm
rear side element lower layer carbon fiber fabric 240 g/m$^2$—(twill weave),—1 layer, material thickness 0.4 mm
rear side element top layer lacquer layer, approx. 0.35 mm; or Variant—3 decorative element top layer lacquer layer, approx. 0.35 mm
decorative element lower layer veneer—1 layer, material thickness 0.6 mm
adjacent layer of carbon fiber fabric 160 g/m$^2$—(plain weave)—1 layer, material thickness 0.26 mm
central layer glass fiber fabric 163 g/m$^2$—(plain weave)—3 layers, CAS 110/0009, total material thickness 0.6 mm
adjacent layer of carbon fiber fabric 160 g/m$^2$—(plain weave)—1 layer, material thickness 0.26 mm
rear side element lower layer veneer—1 layer, material thickness 0.6 mm
rear side element top layer lacquer layer, approx. 0.35 mm; or Variant—4 decorative element top layer lacquer layer, approx. 0.35 mm
decorative element lower layer veneer—1 layer, material thickness 0.6 mm
central layer carbon fiber fabric 240 g/m$^2$—(plain weave)—3 layers, material thickness 1.2 mm
rear side element lower layer veneer—1 layer, material thickness 0.6 mm rear side element top layer lacquer layer, approx. 0.35 mm; or Variant—5 decorative element top layer lacquer layer, approx. 0.35 mm decorative element lower layer veneer—1 layer, material thickness 0.6 mm central layer carbon fiber fabric 200 g/m²—(plain weave)—4 layers, material thickness 1.2 mm rear side element lower layer veneer—1 layer, material thickness 0.6 mm rear side element top layer lacquer layer, approx. 0.35 mm.

Further variants with the formation of different layers are possible, starting from a central layer consisting of carbon fiber fabric or glass fiber fabric or a plastic reinforced with carbon fiber fabric or glass fiber fabric or a ceramic reinforced with carbon fiber fabric or glass fiber fabric or another matrix material reinforced with carbon fiber fabric or glass fiber fabric. Duroplasts, thermoplastics, elastomers, ceramic materials, metallic materials, and other plastics can in particular be used as further matrix materials.

For example, other fiber materials are also possible for fiber fabrics, such as natural fibers, basalt fibers or aramid fibers.

The above-described variants provide preferred structures that ensure dimensional stability of the carrier element by a central layer and respective adjacent layers, as well as dimensional stability of the surface change element as a whole by the formation of the decorative element and the rear side element.

In a further preferred embodiment, the fiber fabrics of the decorative element and the rear side element have a twill weave and the fiber fabrics of the carrier element have a plain weave. The plain weave or twill weave or fabric weave can in particular be formed in 1/1, 2/2, 3/3, 4/4, 2/1, 3/1, 4/1, 3/2, 4/2, etc. modification. For example, the fiber fabrics of the decorative element and the rear side element can also have a plain weave, while the fiber fabrics of the carrier element have a twill weave. For example, the fiber fabrics of the decorative element or of the rear side element and the carrier element can also have the same weave, i.e. twill weave or plain weave. The type of weave determines the undulation of the fibers in the fabric, i.e. the geometry of how the fibers overlap each other, which determines the three-dimensional material properties of the respective layer.

The carbon fiber fabrics optionally used for the decorative element and the rear side element can in particular have a weight per unit area of 240 g/m² or 410 g/m², and preferably be in a range from 180 g/m² to 450 g/m², particularly preferably in a range from 220 g/m² to 420 g/m². Furthermore, the carbon fiber fabric can be in a plain weave or a twill weave, in which the intersecting carbon fibers are preferably oriented at angles of approx. 0° and 90° to one another. The carbon fiber fabrics optionally used for the decorative element and the rear side element can be used e.g. to reinforce a matrix, in particular a plastic, whereby the dimensional stability of the surface element is further increased, or can be used without a matrix, whereby the dimensional stability of the surface element is influenced or increased to a lesser extent.

Furthermore, the layers comprising carbon fiber fabric-reinforced plastic and/or glass fiber fabric-reinforced plastic can optionally comprise different plastics or the same plastic or comprise different matrix materials or the same matrix material. The matrix material for the at least one layer of fiber-reinforced plastic can optionally comprise a fire-resistant epoxy resin system. This can particularly preferably correspond to the aviation guideline CS 25.853 or FAR 25.853 or JAR 25.853, in which the permissible fire and flammability behavior is described.

A further aspect of the invention relates to a surface change element for an aircraft interior cladding, the surface change element comprising a carrier element, the carrier element having a plurality of layers in succession in the thickness direction of the carrier element, which comprise fiber fabrics, and a decorative element attached to a decor connecting surface of the carrier element, the carrier element being dimensionally stable.

A further aspect of the invention relates to the use of a surface change element for changing a surface element arranged at a structural element of an aircraft interior cladding.

A further aspect of the invention relates to a method of producing a surface change element comprising the steps of:
stacking fiber fabrics;
curing to form a carrier element comprising at least one layer of fiber fabric-reinforced plastic, i.e. a plastic reinforced by the fiber fabric;
applying a decorative element to a decor connecting surface of the carrier element.

Preferably, the method of producing the surface change element further comprises that pre-impregnated fiber fabrics are used for the layering of fiber fabrics, or following the layering of fiber fabrics, a further step for impregnating the layered fiber fabrics with synthetic resin or a matrix provided for the fiber fabric.

Further preferably, the method of producing the surface change element, which comprises applying the decorative element to the decor connecting surface of the carrier element, comprises applying lacquer and/or a step for applying a rear side element to a rear side connecting surface of the carrier element, wherein the application of the rear side element to the rear side connecting surface of the carrier element preferably comprises the application of lacquer.

For example, the method of producing the surface change element can also comprise a step for the adhesive application of at least one layer of pre-impregnated carbon fiber fabric or veneer on the decor connecting surface and/or the rear side connecting surface of the carrier element in order to form at least a part of the decorative element and/or at least a part of the rear side element. For example, the production method can also comprise a step for adhesively attaching or covering with leather, fur, nonwovens, tiles, wood or veneer, etc. to form at least part of the decorative element and/or at least part of the rear side element.

A further aspect of the invention relates to a method of reworking an aircraft interior cladding comprising the steps of:
removing a surface change element or decorative element not detachable in a non-destructive way from a structural element;
providing at least one cutout in the structural element;
fixing at least one connecting element in the at least one cutout of the structural element;
detachably attaching a surface change element to the structural element by means of the at least one connecting element.

In the following, embodiments of the invention will be described in more detail with reference to the accompanying figures. It goes without saying that the present invention is not limited to these embodiments and that individual features of the embodiments can be combined to form further embodiments within the scope of the accompanying claims.

Figure 2:
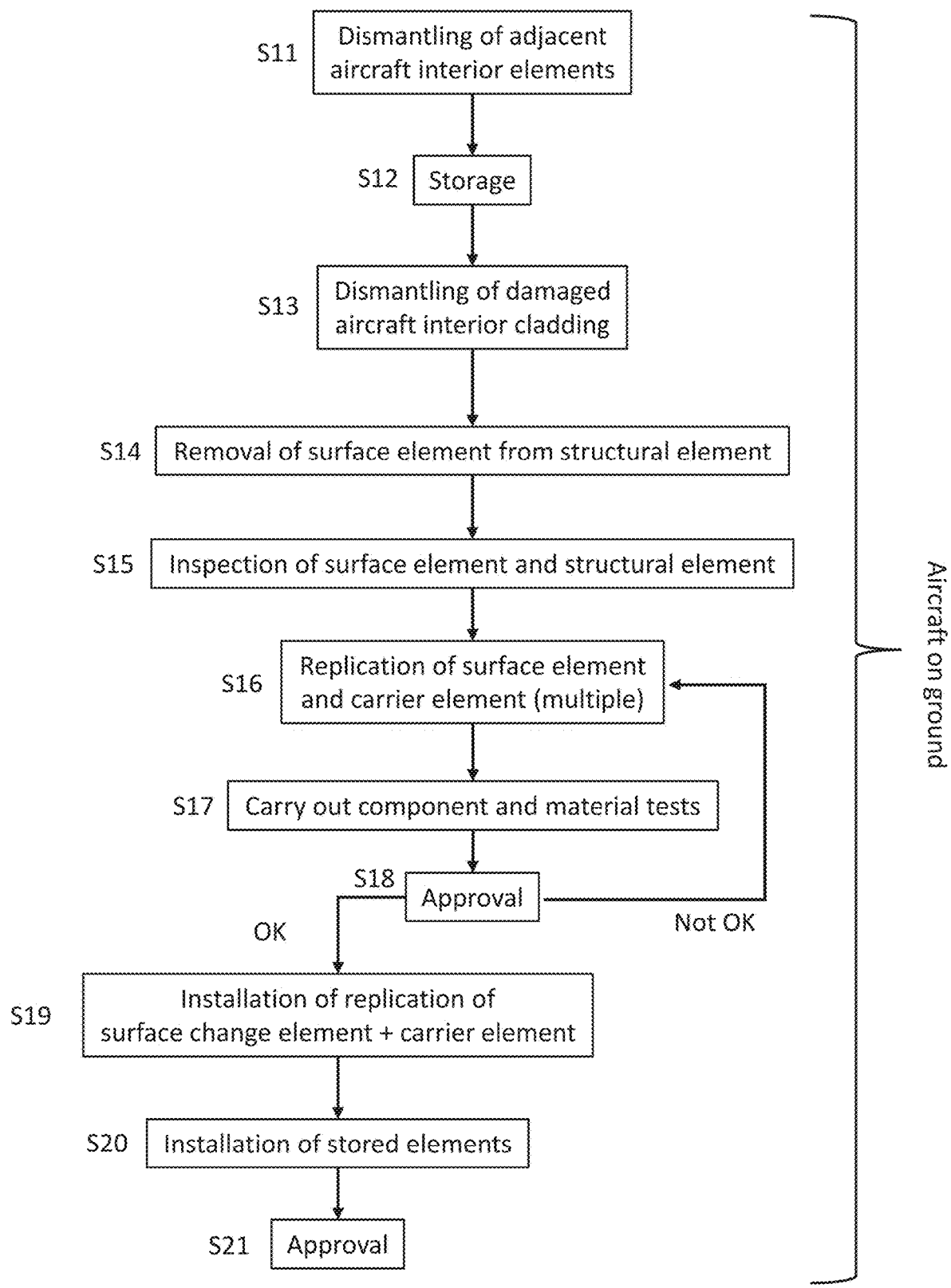
Figure 3:
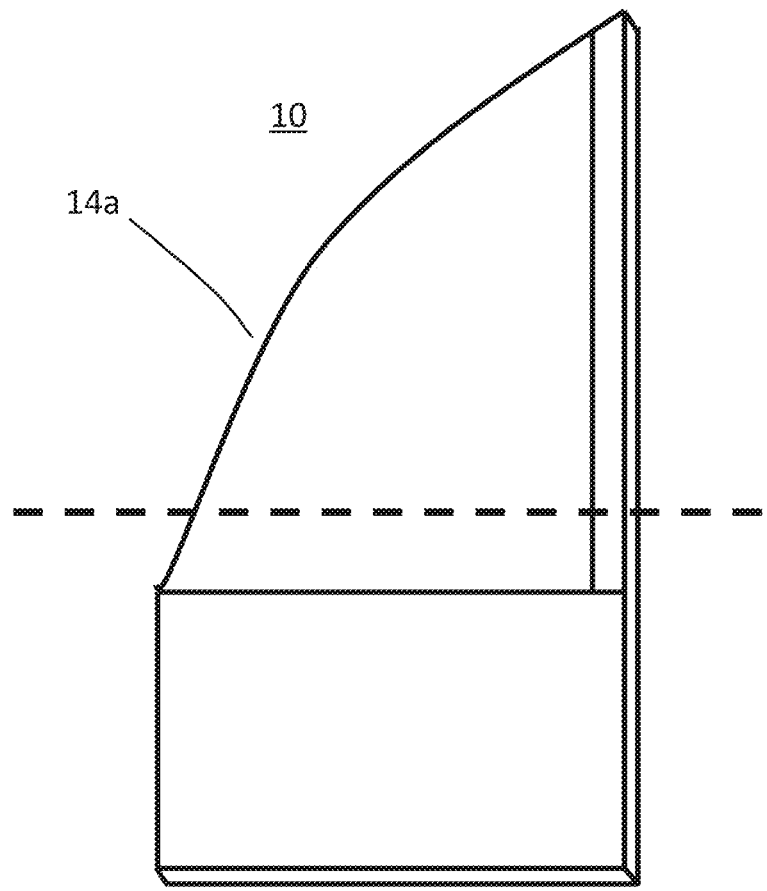
Figure 4:
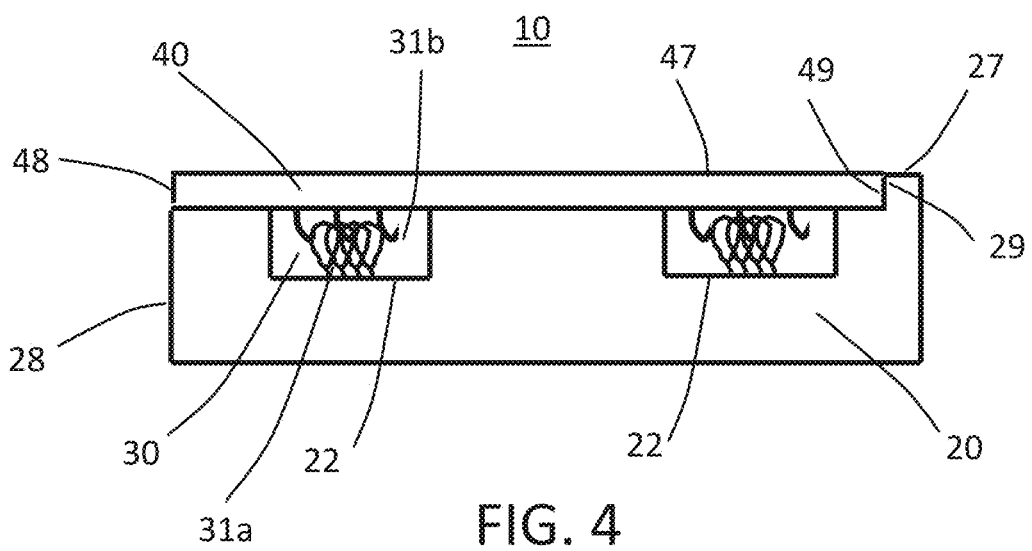
Figure 5:
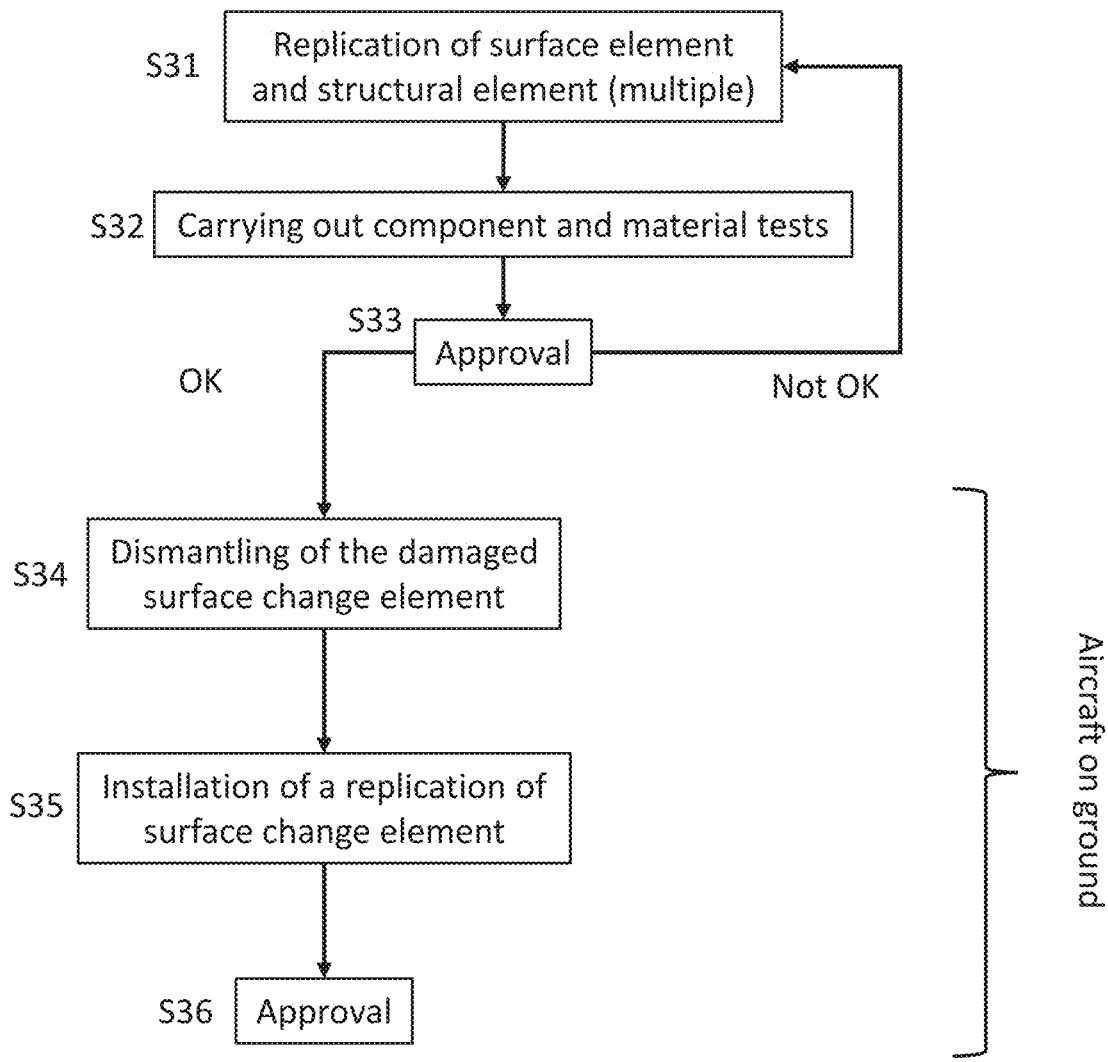
Figure 6:
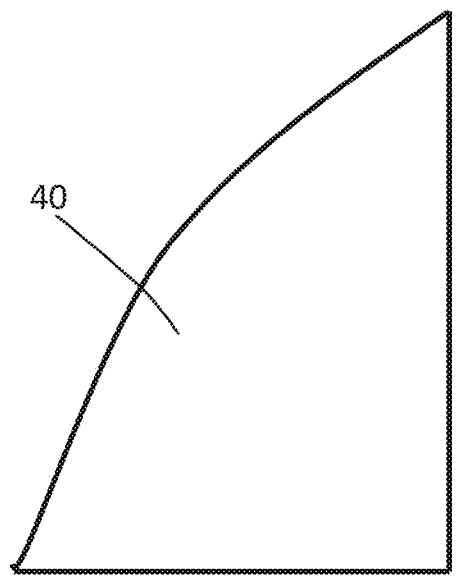
Figure 7:
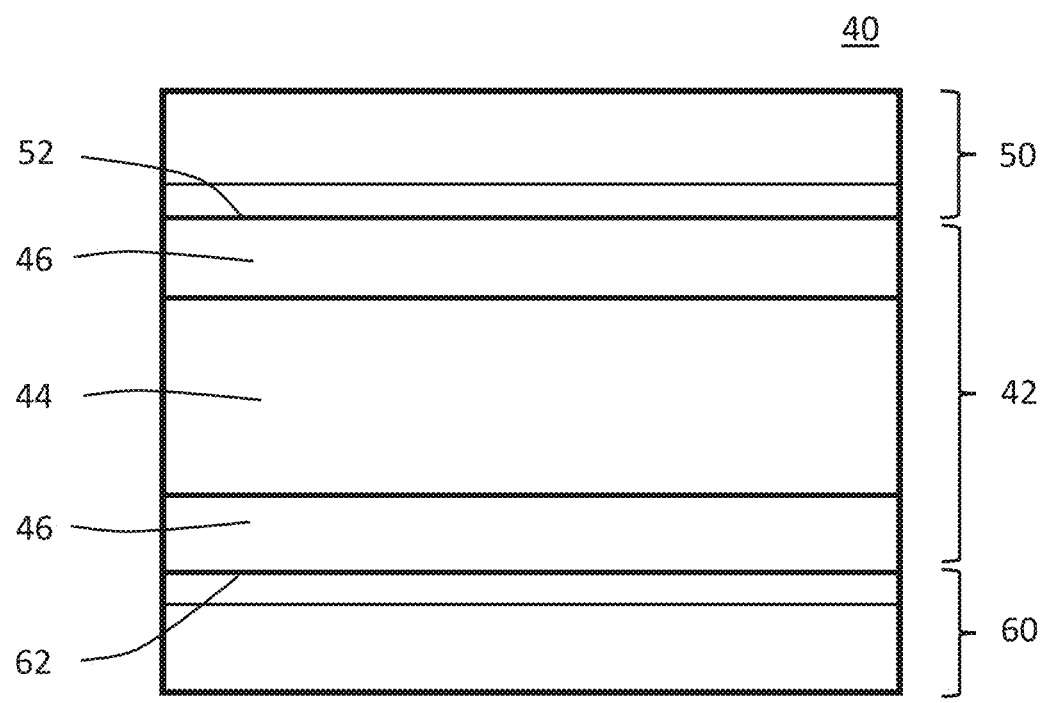
Figure 9A:
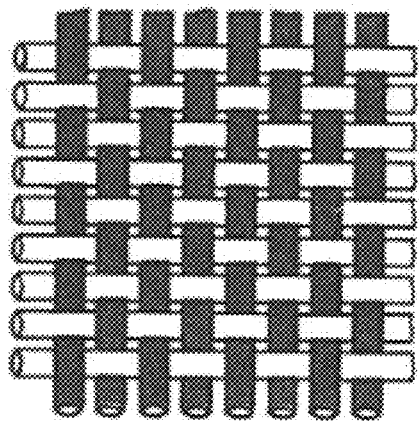
Figure 9B:
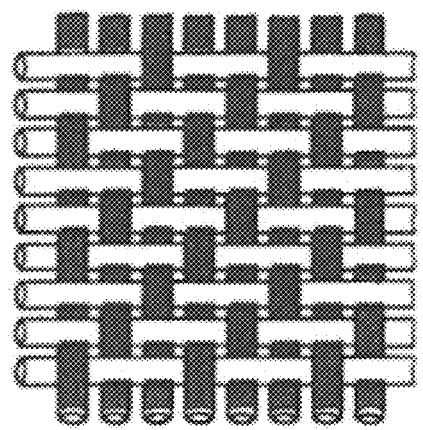
Figure 10:
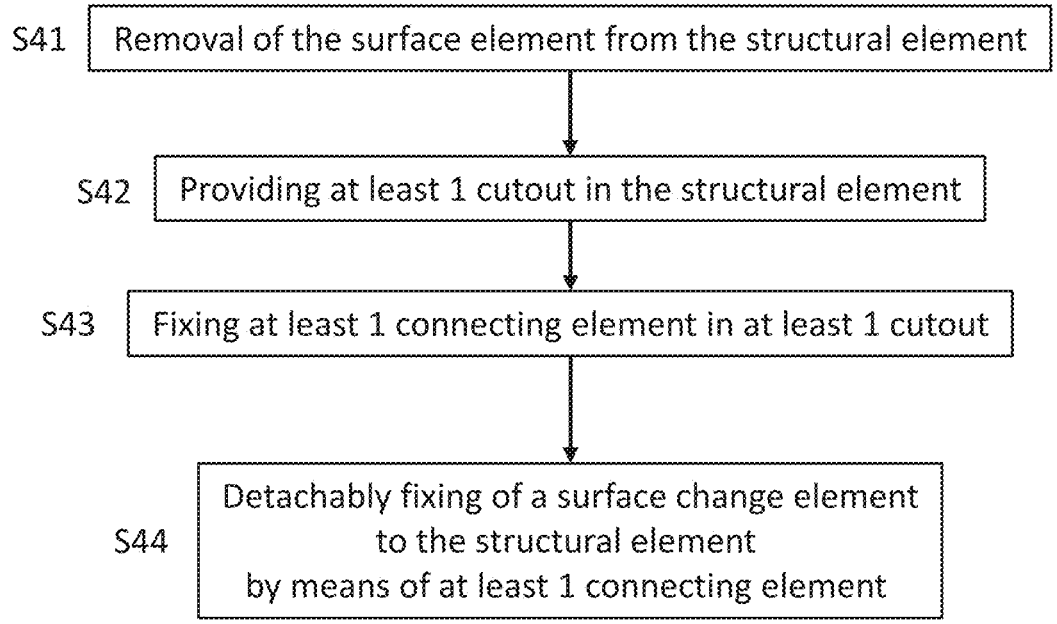
Figure 11:
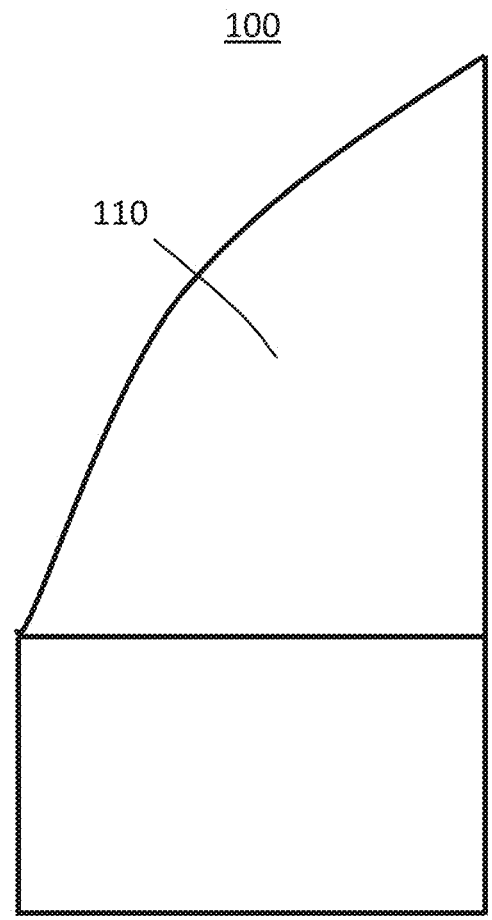
Figure 12A:
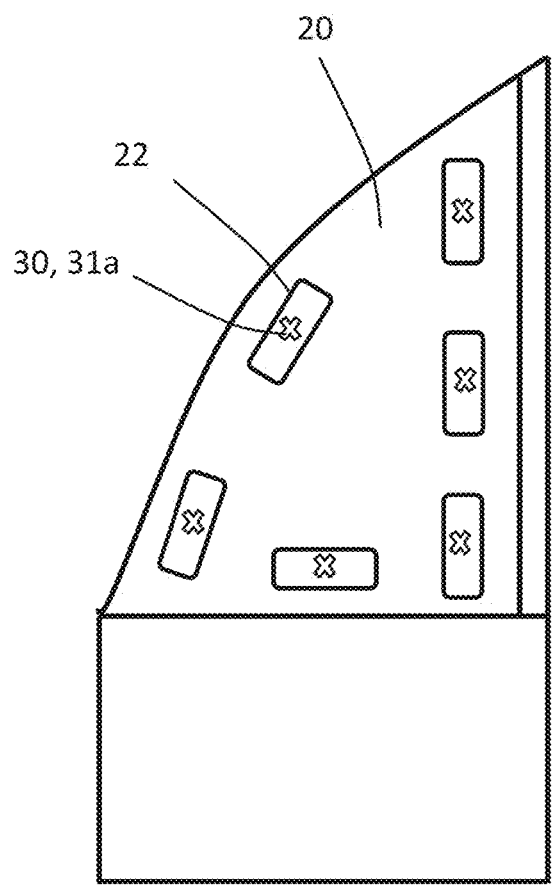
Figure 12B:
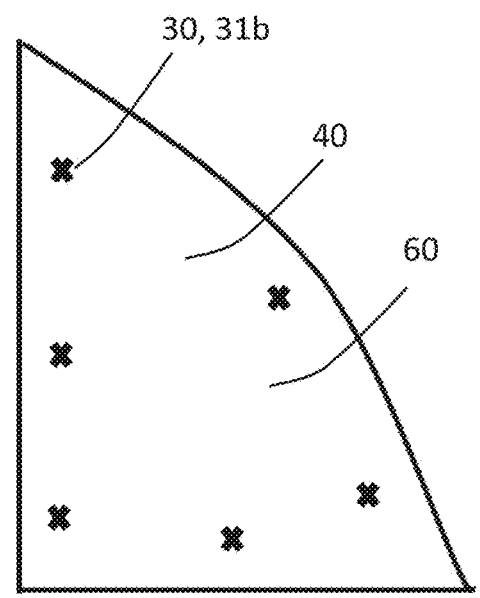

The Figures Show:

FIG. 1 a perspective sketch of an aircraft interior;

FIG. 2 a flowchart of the sequence of an exchange or a repair of a surface element of a conventional aircraft interior cladding;

FIG. 3 a sketch of an aircraft interior cladding according to the invention;

FIG. 4 a schematic cross section of an aircraft interior cladding according to FIG. 3;

FIG. 5 a flow chart of the sequence of an exchange or a repair of a surface element of an aircraft interior cladding according to the invention;

FIG. 6 a sketch of a surface change element according to the invention;

FIG. 7 a schematic cross section of a surface change element;

FIGS. 8A-8F exemplary cross sections of a surface change element according to the invention;

FIGS. 9A and 9B examples of twill and plain weave;

FIG. 10 a flow chart of the reworking of an existing aircraft interior cladding to form an aircraft interior cladding according to the invention;

FIG. 11 a perspective sketch of a structural element to be reworked;

FIGS. 12A-12B a perspective sketch of a structural element reworked according to the invention; and FIGS. 13A-13F examples of connecting elements or connecting sub-elements for an aircraft interior cladding according to the invention.

FIG. 1 shows a perspective sketch of an aircraft interior 8, with windows 11 being shown on the left side of the aircraft interior 8, a table 17 and a dado panel or a side wall element 18. Adjoining the left area at the top are hinged compartments 19 as storage spaces, as they are common in airplanes. In the center of FIG. 1, an intermediate wall or bulkhead 12 is shown, as it can be arranged e.g. to separate the passenger compartment from the cockpit and/or can be arranged to separate between flight classes. This intermediate wall 12 comprises in particular a door 16, a left-side intermediate wall part 13a and a right-side intermediate wall part 13b. The left-side and right-side intermediate wall parts 13a, 13b consist of several bulk head sections or intermediate wall sections 14a, 14b, 14c, 14d. In particular the elements table 17, dado panel 18, door 16 and the bulk head sections 14a, 14b, 14c, 14d are suitable for the structure as an aircraft interior cladding 10 according to the invention, or for reworking into an aircraft interior cladding 10 according to the invention.

As can be seen in FIG. 1 for the bulk head section 14a, it is partially covered by hinged compartments, which reflects the usually nested construction in aircraft.

For conventional aircraft interior claddings, in the event of damage to the bulk head section 14a from FIG. 1, it is necessary to dismantle or demount at least some of the hinged compartments 19 before the components actually to be repaired or to be exchanged can be reached.

FIG. 2 shows, in a flow chart, steps that take place exemplarily for a exchange or repair of a conventional aircraft interior cladding:

Starting with S11: dismantling of the aircraft interior elements adjacent the aircraft interior cladding;

S12: storage of the dismantled elements of the aircraft interior;

S13: dismantling of the aircraft interior cladding to be exchanged or repaired;

S14: removal of the surface element from the structural element of the aircraft interior cladding;

S15: inspection of the surface element and structural element of the aircraft interior cladding to be exchanged or repaired with regard to material, material strength or thickness, material properties in order to determine the materials used;

S16: replication of the surface element and structural element of the aircraft interior cladding to be exchanged or repaired in multiple copies;

S17: carrying out material tests, in particular fire tests of the replicated surface element and structural element, if necessary individually and/or in the assembly;

S18: having the material tests, in particular fire tests, approved by a company with EASA Part 21 J certification, or in accordance with the EASA Part 21 J regulations;

S19: installing a copy of the replicated surface element and structural element in the aircraft, as an exchanged or repaired aircraft interior cladding;

S20: installing the stored, dismantled elements of the aircraft interior; and finally S21 having the exchanged or repaired aircraft interior approved by a company with EASA Part 145 A rating.

As shown in FIG. 2, in order to carry out the exchange or repair, the aircraft must remain on the ground for the entire period beginning with step S11 to step S21, which causes considerable costs and limits the usability of the aircraft. Furthermore, in the conventional process for exchanging or repairing an aircraft interior cladding, as made clear in step S18, in the event of a "not in order" approval, i.e. not OK approval of the material tests and in particular of the fire tests, the repair effort increases considerably, since new components for the exchange or repair must first be produced. In addition, the time on the ground of the aircraft also increases, since the aircraft cannot fly any more during the period for exchanging or repairing the aircraft interior cladding, which also reduces the usability of the aircraft.

FIG. 3 shows a sketch of an aircraft interior cladding 10 by means of a bulk head section 14a. Furthermore, a section line is shown in FIG. 3, on the basis of which an exemplary section through the aircraft interior cladding 10 is shown in FIG. 4.

As shown in FIG. 4 as a schematic cross-section through an aircraft interior cladding 10, cutouts 22 are provided in a structural element 20. In the cutouts 22, connecting elements 30 are attached to the structural element 20, with the surface change element 40 and the structural element 20 being non-destructively detachably connected to one another by means of the connecting elements 30. As indicated in FIG. 4, the connecting element 30 can be designed in several parts as a first connecting sub-element 31a, arranged at the structural element, and a second connecting sub-element 31b, arranged at the surface change element 40. The connecting element 30 or the first and second connecting sub-elements 31a, 31b can be designed as hook-and-loop tape connection, or, for example, as hook on hook, double-sided adhesive tape, magnetic elements, magnetic paints, magnetic lacquers, push-button systems, screw connections, hooks and eyelets, as well as rails for inserting, rolling in, clamping in, hanging, hooking in, clicking in and screwing in. For example, the first connecting sub-element 31a can comprise hooks and the second connecting sub-element 31b can comprise eyelets, or vice versa. For example, the first connection sub-element 31a can comprise hooks and the second connection sub-element 31b can comprise hooks. For example, the connecting element 30 can be made in one piece and only be attached to the surface change element 40 or to the structural element 20, for example as a magnetic connecting element, with the structural element 20 or the surface change element 40 providing an element complementary to the magnetic connecting element in order to create a magnetic effect as a connection.

Furthermore, a face 47, a first side edge 48 and a second side edge 49 of the surface change element 40 are shown in FIG. 4. A structural element surface 27, a first structural element side edge 28 and a second structural element side edge 29 are also shown in FIG. 4. Due to the dimensionally stable carrier element 42 of the surface change element 40, the surface change element 42 does not have any twists, bulges, bumps or the like. Thus, the gaps of the surface change element 40 to the structural element 20, which form between the first side edge 48, the surface change element 40, and the first structural element side edge 28, can be precisely maintained or adjusted, and can be reproduced by surface change elements 40 for the exchange. Furthermore, due to the dimensional stability of the carrier element 42, the surface change element 40 can be provided such that the face 47 of the surface change element 40 is aligned with the structural element surface 27 or lies in one plane with it. Furthermore, due to the dimensional stability of the carrier element 42, the surface change element 40 can be provided such that the second side edge 49 of the surface change element is aligned with the structural element side edge 29 or lies in one plane with it.

Since the dimensional stability of the carrier element 42 enables a precise manufacture of the surface change element 40 for the side element 20, and furthermore no bulges, bumps or twisting occur at the surface change element 40, the connecting sub-elements 31b arranged at the surface change element 40 can be uniformly engaged with the connecting sub-elements 31a arranged at the structural element 20 in all cutouts 22 of the structural element 20. This provides a reliable, detachable, in particular non-destructively detachable connection between the surface change element 40 and the structural element 20.

FIG. 5 shows exemplarily how the exchange or repair of the aircraft interior cladding according to the invention can take place and basically comprises the following steps: Starting with S31: manufacture of surface change elements for the exchange and of structural elements corresponding to the aircraft interior cladding to be exchanged or repaired in multiple copies;

S32: carrying out material tests, in particular fire tests, of the manufactured surface change element and structural element, if necessary individually and/or in the assembly;

S33: having the material tests, in particular fire tests, approved by a company with EASA Part 21J certification, or in accordance with the EASA Part 21J regulations;

S34: dismantling of the surface change element of the aircraft interior cladding to be exchanged or repaired;

S35: installing a copy of the manufactured surface change element for the exchange in the aircraft; and finally S36: having the exchanged or repaired aircraft interior approved by a company with EASA Part 145 A rating.

FIG. 6 shows a plan view of the surface change element 40 exemplarily for a bulk head section 14a.

FIG. 7 shows the schematic cross-section of the surface change element 40, which is subdivided exemplarily into decorative element 50, carrier element 42, and rear side element 60. The decorative element 50 is attached to a decor connecting surface 52 of the carrier element 42, preferably attached in a manner that it cannot non-destructively be detached. The rear side element 60 is attached to a rear side element connecting surface 62 of the carrier element 42, preferably attached in a manner that it cannot non-destructively be detached. The carrier element 42 is in turn divided into a central layer 44 and two layers 46 adjoining the central layer 44 on both sides. For example, the carrier element 42 can also be constructed such that it consists only of a central layer 44 and does not have an adjacent layer 46. In a further example, the carrier element 42 can also be constructed such that it consists only of a central layer 44 and only a single adjacent layer 46, in other words the adjacent layer 46 can only be attached to the central layer 44 on one side, i.e. either be attached in the direction of the decorative element 50 or in the direction of the rear side element 60.

Furthermore, a subdivision of the decorative element 50 and the rear side element 60 is shown in FIG. 7. For example, the decorative element 50 can consist of different layers, such as veneer and lacquer, carbon fiber fabric and lacquer, carbon fiber fabric and leather, or any other possible combination of the materials lacquer, veneer, synthetic wood, real wood, fabrics, leather, ultra leather, furs, wallpaper, real carbon or real fiber composite material, hardboard, laminate, plastic, sheet metal, stone, Corian, foils and many other materials. For example, the decorative element 50 can also consist of just one layer of one of the materials such as lacquer, veneer, synthetic wood, real wood, fabrics, leather, ultra leather, furs, wallpaper, real carbon or real fiber composite material, hardboard, laminate, plastic, sheet metal, stone, Corian or a foil.

The rear side element 60 can also consist of different layers, such as veneer and lacquer, carbon fiber fabric and lacquer, carbon fiber fabric and leather or any other possible combination of the materials lacquer, veneer, synthetic wood, real wood, fabrics, leather, ultra leather, fur, wallpaper, real carbon or real fiber composite material, hardboard, laminate, plastic, sheet metal, stone, Corian, foils and many other materials. For example, the rear side element 60 can also consist of just one layer of one of the materials such as paint, veneer, synthetic wood, real wood, fabrics, leather, ultra leather, furs, wallpaper, real carbon or real fiber composite material, hardboard, laminate, plastic, sheet metal, stone, Corian or a foil.

In addition, the surface change element 40 may also consist only of carrier element 42 and decorative element 50, in the forms described above, without a rear side element 60 being attached or arranged at carrier element 42.

Advantageously, the aircraft interior cladding 10 shown in FIGS. 3 and 4, in conjunction with the exemplary structure of a surface change element 40 shown in FIG. 7, allows a quick exchange of the aircraft interior cladding 10 and only little effort and thus low costs for the exchange or repair of a damaged aircraft interior cladding 10 occur. Here, the aircraft interior cladding 10 advantageously makes is possible that the surface change element 40 replaces the surface change element 40 to be exchanged or repaired with a dimensionally stable carrier element 42, and in particular to maintain gap dimensions, whereby costly reworking on the carrier element 42 and/or on the surface change element 40 is prevented, which further reduces the work-related effort, time expenditure and thus also costly exchange or repair of the aircraft interior cladding 10, in the event of damage. Furthermore, component and material tests, in particular fire tests, can advantageously be carried out prior to the actual dismantling or exchange of the damaged surface change element 40, using surface change elements 40 for the exchange, since the materials of the surface change element 40 to be exchanged are known. The validation documents resulting from the component and material tests can thus be prepared before the actual exchange or repair, so that the exchange or repair of the surface change element 40 can be carried out significantly faster compared to the conventional method.

From a comparison of FIG. 5 with FIG. 2 it becomes clear that, according to the aircraft interior cladding 10 according to the invention, the work-related effort and thus also the time expenditure is reduced. In the case of a not in order approval of the material tests, in particular the fire tests, a possibly necessary loop for the production of new surface change elements 40 can be carried out, this additional expenditure, as illustrated in FIG. 5, not affecting the aircraft's time on the ground.

By using surface change elements 40, the production of surface change elements 40 and the component or material tests, in particular fire tests, can be carried out in advance even prior to the actual exchange or repair of a damaged aircraft interior cladding 10. The dimensional stability of the carrier element 42 ensures that a surface change element 40 of the same shape can be used at the time of the exchange or repair to be carried out, so that not only the overall duration of the exchange or repair is reduced, but also the usability of the aircraft is increased, since the number and the scope of the steps, which can only be carried out while the aircraft is on the ground, are reduced compared to a conventional aircraft interior cladding and its exchange or repair.

Particularly preferred embodiments of the aircraft interior cladding 10 can have surface change elements 40 with the layered structures as shown in FIG. 8A to 8F, or consist of them.

As an overview, the sub-items of the respective variant are ordered in the thickness direction, wherein the uppermost sub-item corresponding to the layer or element of the respective figure which is arranged at the very top in the thickness direction, and the lowest sub-item corresponds to the layer or element of the respective figure which is arranged at the very bottom in the thickness direction. In other words, the layers are arranged from the outside to the inside in as listed.

If the decorative element 50 and/or the rear side element 60 in one of FIGS. 8A to 8F consist of several layers or materials, the decorative element 50 and the rear side element 60 are conceptually subdivided for the purpose of overview, for which the terms decorative element upper layer, decorative element lower layer, as well as rear side element upper layer and rear side element lower layer will be used. The decorative element upper layer and the rear side element upper layer are on the outside in the thickness direction of the surface change element. Whereas the decorative element lower layer and the rear side element lower layer lie in the thickness direction between the decorative element upper layer or the rear side element upper layer and the carrier element 42, formed from the central layer 44 plus optionally adjacent layer(s) 46.

FIG. 8A: Variant—1 decorative element top layer—lacquer layer, approx. 0.35 mm
decorative element lower layer—carbon fiber fabric 410 g/m$^2$—(twill weave), (carbon design)—1 layer, material thickness approx. 0.6 mm
adjacent layer carbon fiber fabric 160 g/m$^2$—(plain weave)—1 layer, material thickness approx. 0.26 mm
central layer glass fiber fabric 163 g/m$^2$—(plain weave)—3 layers, CAS 110/0009, total material thickness about 0.6 mm
adjacent layer carbon fiber fabric 160 g/m$^2$—(plain weave)—1 layer, material thickness approx. 0.26 mm
rear side element lower layer carbon fiber fabric 410 g/m$^2$—(twill weave), (design carbon)—1 layer, material thickness approx. 0.6 mm
rear side element top layer lacquer layer, approx. 0.35 mm

FIG. 8B: Variant—2 decorative element top layer—lacquer layer, approx. 0.35 mm
decorative element lower layer—carbon fiber fabric 240 g/m$^2$—(twill weave),—1 layer, material thickness approx. 0.4 mm
central layer carbon fiber fabric 200 g/m$^2$—(plain weave)—5 layers, material thickness about 1.6 mm
rear side element lower layer carbon fiber fabric 240 g/m$^2$—(twill weave),—1 layer, material thickness about 0.4 mm
rear side element top layer lacquer layer, approx. 0.35 mm

FIG. 8C: Variant—3 decorative element top layer lacquer layer, approx. 0.35 mm
decorative element lower layer veneer—1 layer, material thickness about 0.6 mm
adjacent layer carbon fiber fabric 160 g/m$^2$—(plain weave)—1 layer, material thickness approx. 0.26 mm
central layer glass fiber fabric 163 g/m$^2$—(plain weave)—3 layers, CAS 110/0009, total material thickness about 0.6 mm
adjacent layer carbon fiber fabric 160 g/m$^2$—(plain weave)—1 layer, material thickness approx. 0.26 mm
rear side element lower layer veneer—1 layer, material thickness about 0.6 mm
rear side element top layer lacquer layer, approx. 0.35 mm

FIG. 8D: Variant—4 decorative element top layer lacquer layer, approx. 0.35 mm
decorative element lower layer veneer—1 layer, material thickness approx. 0.6 mm
central layer carbon fiber fabric 240 g/m$^2$—(plain weave)—3 layers, material thickness approx. 1.2 mm
rear side element lower layer veneer—1 layer, material thickness about 0.6 mm
rear side element top layer lacquer layer, approx. 0.35 mm

FIG. 8E: Variant—5 decorative element top layer lacquer layer, approx. 0.35 mm
decorative element lower layer veneer—1 layer, material thickness about 0.6 mm
central layer carbon fiber fabric 200 g/m$^2$—(plain weave)—4 layers, material thickness about 1.2 mm
rear side element lower layer veneer—1 layer, material thickness about 0.6 mm
rear side element top layer lacquer layer, approx. 0.35 mm

FIG. 8F: Further Other Variant decorative element top layer leather, approx. 0.5 mm
decorative element lower layer carbon fiber fabric 240 g/m² —(twill weave),—1 layer, material thickness approx. 0.45 mm
central layer glass fiber fabric 163 g/m²—(plain weave)—3 layers, CAS 110/0009, total material thickness about 0.6 mm
rear side element lower layer carbon fiber fabric 240 g/m²—(twill weave),—1 layer, material thickness approx. 0.45 mm
rear side element upper layer leather, approx. 0.5 mm Further variants for the construction of the surface change element 40 with the formation of different layers are possible, starting from a dimensionally stable carrier element 42 having a central layer 44 consisting of carbon fiber fabric or glass fiber fabric or a plastic reinforced with carbon fiber fabric or glass fiber fabric. For example, a ceramic or other matrix material can also be used as a matrix for the glass fiber fabric or carbon fiber fabric. Thermosets, thermoplastics, elastomers, ceramic materials, metallic materials, and other plastics can in particular be used as further matrix materials.

In FIG. 9A a plain weave or 1/1 fabric weave is shown, while in FIG. 9B an exemplary twill weave or a 2/1 weave is shown.

For example, the fiber fabrics of the decorative element 50 and the fiber fabrics of the rear side element 60 can have a twill weave and the fiber fabrics of the carrier element 42 can have a plain weave. The plain weave or twill weave or fabric weave can in particular be formed in 1/1, 2/2, 3/3, 4/4, 2/1, 3/1, 4/1, 3/2, 4/2, etc. modification. For example, the fiber fabrics of the decorative element 50 and the fiber fabrics of the rear side element 60 can also have a plain weave, while the fiber fabrics of the carrier element 42 have a twill weave. For example, the fiber fabrics of the decorative element 50 or of the rear side element 60 and of the carrier element 42 can also have the same weave, i.e. twill weave or plain weave. The type of weave determines the undulation of the fibers in the fabric, i.e. the geometry of how the fibers overlap each other, which determines the three-dimensional material properties of the respective layer, whereby the dimensional stability of the carrier element and the surface element can also be influenced.

FIG. 10 shows a method of reworking an existing aircraft interior cladding 100 into an aircraft interior cladding 10 according to the invention, which in particular comprises the following steps:

Beginning with S41: Removal of a surface element 110 that cannot be detached non-destructively from a structural element 20. In this case, the surface element 110 is frequently damaged or destroyed;

S42: providing at least one cutout 22 in the structural element 20;

S43: fixing at least one connecting element 30 in the at least one cutout 22 of the structural element 20; and S44: detachably fixing a surface change element 40 to the structural element 20 by means of the at least one connecting element 30.

While FIG. 11 shows an exemplary aircraft interior cladding 100 with a conventional surface element 110, FIGS. 12A and 12B show an aircraft interior cladding 10 according to the invention, consisting of a surface change element 40 and a structural element 20, wherein the structural element 20 has cutouts 22 in which one or more connecting elements 30 or one or more connecting sub-elements 31a is or are attached, and wherein one or more connecting elements 30 or one or more connecting sub-elements 31b is or are attached to the rear side element 60 of the surface change element 40.

The reworking procedure from an aircraft interior cladding 100, as shown in FIG. 11, into an aircraft interior cladding 10, as shown with FIGS. 12A and 12B, takes place with the aid of the method as shown in FIG. 10.

In FIGS. 13A to 13F, different embodiments of exemplary connecting elements 30 or connecting sub-elements 31a, 31b are shown: In FIGS. 13A to 13F, in particular the connecting element 30 or connecting sub-element 31a, 31b hook-and-loop tape is shown, which is suitable as a detachable connecting element 30 or a connecting element 30 than can be detached non-destructively. For example, the connecting element 30 or the connecting sub-elements 31a, 31b can also be used as hooks on hooks, double-sided adhesive tape, magnetic elements, magnetic paints, magnetic lacquers, push-button systems, screw connections, hooks and eyes, as well as rails for insertion, rolling, clamping, hanging, hooking, clicking and screwing.

The connecting element 30 or connecting sub-element 31a, 31b can be fastened to the surface change element 40, to the structural element 20 or to the structural element 20 and to the surface change element 40.

Figure 13A:
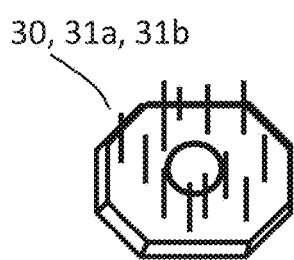
Figure 13B:
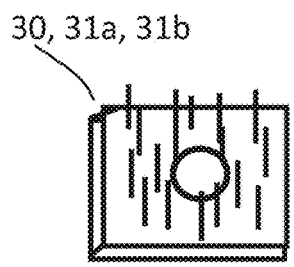
Figure 13C:
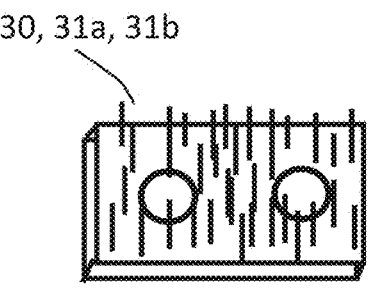

As shown in FIGS. 13A, 13B and 13C, the connecting element 30 or connecting sub-element 31a, 31b can have a hole or an opening or a plurality of holes or openings. By means of the hole or the opening, the connecting element 30 or connecting sub-element 31a, 31b can be attached to the structural element 20 and/or surface change element 40 with a screw connection on the one hand. On the other hand, the connecting element 30 or the connecting sub-element 31a, 31b can also be attached with the aid of an anchor element as a so-called insert. In order to attach the connecting element 30 or connecting sub-element 31a, 31b as an insert to the structural element 20 and/or surface change element 40, epoxy resin can e.g. be used, which penetrates into the hole or opening, as shown in FIGS. 13A to 13C, and during hardening connects the connecting element 30 or connecting sub-element 31a, 31b to the structural element 20 and/or surface change element 40, in particular in a manner that it cannot non-destructively be detached. In other words, the connecting element 30 or the connecting sub-element 31a, 31b can also be produced integrally with the structural element 20 or the surface change element 40.

Figure 13D:
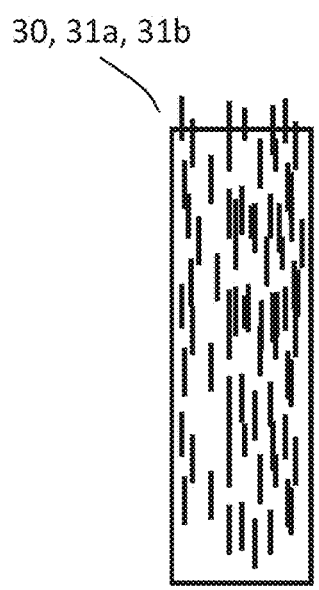
Figure 13E:
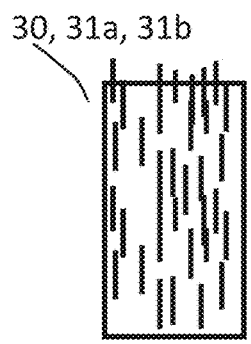

FIGS. 13D and 13E exemplarily show that the connecting element 30 or connecting sub-element 31a, 31b can also be attached adhesively, for example as a flat adhesive tape, to the structural element 20 and/or the surface change element 40, wherein the adhesive connection between the connecting element 30 and the structural element 20 or the surface change element 40 is a not non-destructively releasable connection or a non-destructively releasable connection. For example, the connecting element 30 or connecting sub-element 31a, 31b can also be connected to the structural element 20 or the surface change element 40 non-destructively detachably by means of a hook-and-loop tape.

Figure 13F:
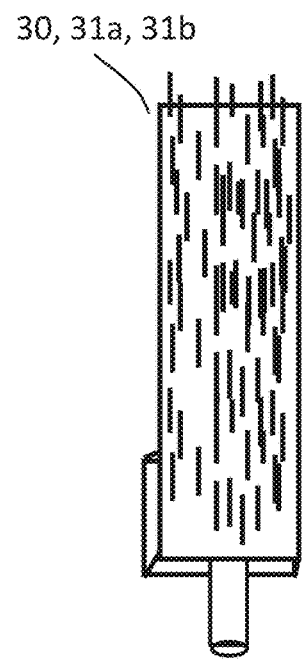

As shown in FIG. 13F, the connecting element 30 or connecting sub-element 31a, 31b can also comprise a pin-like element, which is suitable for being plugged into a honeycomb structure, an insert in a honeycomb structure, or into another receiving element in order to be connected to the structural element 20 or the surface change element 40 preferably in a non-destructively detachable manner, or not non-destructively detachable manner.

LIST OF REFERENCE NUMERALS 8 aircraft interior
10 aircraft interior cladding
11 windows
12 bulkhead or intermediate wall
13a left-side intermediate wall part
13b right-side intermediate wall part
14a,b,c,d bulk head section or intermediate wall section
16 door
17 table
18 dado panel/side wall element
19 hinged compartments
20 structural element
27 structural element surface
28 first structural element side edge
29 second structural element side edge
22 cutout
30 connecting element
31a first connecting sub-element
31b second connecting sub-element
40 surface change element
42 carrier element
44 central layer
46 adjacent layer
47 face
48 first side edge
49 second side edge
50 decorative element
52 decor connecting surface
60 rear side element
62 rear side element connecting surface
100 exemplary aircraft interior cladding
110 surface element
S11-S21 steps to exchange or repair a conventional aircraft interior cladding
S31-S36 steps to exchange or repair an aircraft interior cladding according to the invention
S41-S44 steps to rework an existing surface element into a surface change element according to the invention

The invention claimed is:

1. An aircraft interior cladding, comprising:
a plate-shaped surface change element,
wherein the plate-shaped surface change element comprises:
a carrier element having in a thickness direction of the carrier element a plurality of successive layers which comprise fiber fabrics, and
a decorative element attached to a decor connecting surface of the carrier element,
wherein the carrier element is dimensionally stable, and
wherein the aircraft interior cladding comprises:
a structural element; and
at least one connecting element,
wherein the plate-shaped surface change element is detachably secured to the structural element with the at least one connecting element.

2. The aircraft interior cladding according to claim 1, wherein a locking element is arranged at the structural element in order to releasably lock the plate-shaped surface change element at the structural element.

3. The aircraft interior cladding according to claim 1, wherein the plate-shaped surface change element comprises a rear side element attached to a rear side connecting surface of the carrier element, the rear side connecting surface being opposite to the decor connecting surface in the thickness direction.

4. The aircraft interior cladding according to claim 3, wherein the decorative element and/or the rear side element each have a lacquer layer.

5. The aircraft interior cladding according to claim 4, wherein the lacquer layers of the decorative element and the rear side element are of a same thickness.

6. The aircraft interior cladding according to claim 3, wherein the decorative element and/or the rear side element each comprise a carbon fiber fabric or a veneer element in the thickness direction toward the carrier element.

7. The aircraft interior cladding according to claim 1, wherein the carrier element comprises, arranged centrally in the thickness direction, a central layer comprising a carbon fiber fabric-reinforced plastic or a glass fiber fabric-reinforced plastic.

8. The aircraft interior cladding according to claim 7, wherein, in the thickness direction, the carrier element comprises an adjacent layer of carbon fiber fabric-reinforced plastic at both sides outwardly adjoining the central layer.

9. The aircraft interior cladding according to claim 1, wherein the carrier element is constructed symmetrically in the thickness direction, and/or wherein the surface change element is constructed symmetrically in the thickness direction.

10. The aircraft interior cladding according to claim 8, wherein the layers comprising carbon fiber fabric-reinforced plastic and/or glass fiber fabric-reinforced plastic have different plastics, or
wherein the layers comprising carbon fiber fabric-reinforced plastic and/or glass fiber fabric-reinforced plastic have the same plastic, and
wherein the layers comprising carbon fiber fabric-reinforced plastic and/or glass fiber fabric-reinforced plastic comprise a fire-resistant epoxy resin system as plastic.

11. A method of reworking an aircraft interior cladding, the method comprising:
removing a surface element, which cannot be detached in a non-destructive way, from a structural element;
making at least one cutout in the structural element;
securing at least one connecting element in the at least one cutout of the structural element;
releasably securing a surface change element using the at least one connecting element at the structural element.

* * * * *